(12) United States Patent
Narayanan et al.

(10) Patent No.: US 12,119,014 B2
(45) Date of Patent: *Oct. 15, 2024

(54) JOINT ACOUSTIC ECHO CANCELATION, SPEECH ENHANCEMENT, AND VOICE SEPARATION FOR AUTOMATIC SPEECH RECOGNITION

(71) Applicant: Google LLC, Mountain View, CA (US)

(72) Inventors: Arun Narayanan, Santa Clara, CA (US); Tom O'malley, Mountain View, CA (US); Quan Wang, Hoboken, NJ (US); Alex Park, Mountain View, CA (US); James Walker, Mountain View, CA (US); Nathan David Howard, Mountain View, CA (US); Yanzhang He, Mountain View, CA (US); Chung-Cheng Chiu, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 310 days.

This patent is subject to a terminal disclaimer.

(21) Appl. No.: 17/644,108

(22) Filed: Dec. 14, 2021

(65) Prior Publication Data
US 2023/0038982 A1    Feb. 9, 2023

Related U.S. Application Data

(60) Provisional application No. 63/260,100, filed on Aug. 9, 2021.

(51) Int. Cl.
*G10L 21/0216* (2013.01)
*G06N 3/04* (2023.01)
(Continued)

(52) U.S. Cl.
CPC ............ *G10L 21/0216* (2013.01); *G06N 3/04* (2013.01); *G10L 15/063* (2013.01); *H04R 3/04* (2013.01); *G10L 2021/02082* (2013.01)

(58) Field of Classification Search
CPC ............... G10L 21/0216; G10L 15/063; G10L 2021/02082; G06N 3/04; H04R 3/04
See application file for complete search history.

(56) References Cited

U.S. PATENT DOCUMENTS

| 9,286,883 | B1 | 3/2016 | Ayrapetian et al. |
| 11,521,635 | B1* | 12/2022 | Chhetri ............... G06N 3/0455 |
| 2009/0187402 | A1* | 7/2009 | Scholl ................... G10L 15/01 |
| | | | 704/E15.039 |
| 2018/0040333 | A1 | 2/2018 | Wung et al. |

(Continued)

OTHER PUBLICATIONS

Wang, Recurrent Deep Stacking Networks for Supervised Speech Separation, 2017, IEE, whole document (Year: 2017).*

(Continued)

*Primary Examiner* — Sonia L Gay
(74) *Attorney, Agent, or Firm* — Honigman LLP; Brett A. Krueger; Grant Griffith

(57) ABSTRACT

A method for automatic speech recognition using joint acoustic echo cancellation, speech enhancement, and voice separation includes receiving, at a contextual frontend processing model, input speech features corresponding to a target utterance. The method also includes receiving, at the contextual frontend processing model, at least one of a reference audio signal, a contextual noise signal including noise prior to the target utterance, or a speaker embedding including voice characteristics of a target speaker that spoke the target utterance. The method further includes processing, using the contextual frontend processing model, the input speech features and the at least one of the reference audio signal, the contextual noise signal, or the speaker embedding vector to generate enhanced speech features.

24 Claims, 7 Drawing Sheets

(51) Int. Cl.
*G10L 15/06* (2013.01)
*G10L 21/0208* (2013.01)
*H04R 3/04* (2006.01)

(56) References Cited

U.S. PATENT DOCUMENTS

| | | | |
|---|---|---|---|
| 2020/0312345 A1 | 10/2020 | Fazeli et al. | |
| 2020/0349965 A1 | 11/2020 | Nesta et al. | |
| 2022/0148571 A1* | 5/2022 | Wang | G10L 21/02 |
| 2022/0215832 A1* | 7/2022 | Ren | G10L 15/16 |
| 2022/0310108 A1* | 9/2022 | Byun | G10L 21/02 |

OTHER PUBLICATIONS

Jul. 8, 2022 Written Opinion (WO) of the International Searching Authority (ISA) and International Search Report (ISR) issued in International Application No. PCT/US2021/063196.

Howard Nathan et al: "A Neural Acoustic Echo Canceller Optimized Using an Automatic Speech Recognizer and Large Scale Synthetic Data", ICASSP 2021-2021 IEEE International ,Conference on Acoustics, Speech and Signal Processing (ICASSP), IEEE, Jun. 6, 2021 (Jun. 6, 2021), pp. 7128-7132.

Halimeh Mhd Modar et al: "Combining Adaptive Filtering and Complex-Valued Deep Postfiltering for Acoustic Echo Cancellation", ICASSP 2021-2021 IEEE International Conference on Acoustics, Speech and Signal Processing (ICASSP), IEEE, Jun. 6, 2021 (Jun. 6, 2021), pp. 121-125.

Fazel Amin et al: "CAD-AEC: Context-Aware Deep Acoustic Echo Cancellation", ICASSP 2020-2020 IEEE International Conference on Acoustics, Speech and Signal Processing (ICASSP), IEEE, May 4, 2020 (May 4, 2020), pp. 6919-6923.

Jian Wu et al: "Investigation of Practical Aspects of Single Channel Speech Separation for ASR", ARXIV.ORG <http://arxiv.org>, Cornell University Library, 201 Olin Library Cornell University Ithaca, NY 14853, Jul. 5, 2021 (Jul. 5, 2021).

* cited by examiner

JOINT ACOUSTIC ECHO CANCELATION, SPEECH ENHANCEMENT, AND VOICE SEPARATION FOR AUTOMATIC SPEECH RECOGNITION

CROSS REFERENCE TO RELATED APPLICATIONS

This U.S. patent application claims priority under 35 U.S.C. § 119(e) to U.S. Provisional Application 63/260,100, filed on Aug. 9, 2021. The disclosure of this prior application is considered part of the disclosure of this application and is hereby incorporated by reference in its entirety.

TECHNICAL FIELD

This disclosure relates to joint acoustic echo cancelation, speech enhancement, and voice separation for automatic speech recognition.

SUMMARY

One aspect of the disclosure provides a computer-implemented method for automatic speech recognition using joint acoustic echo cancellation, speech enhancement, and voice separation. The computer-implemented method when executed on data processing hardware causes the data processing hardware to perform operations that include receiving, at a contextual frontend processing model, input speech features corresponding to a target utterance. The operations also include receiving, at the contextual frontend processing model, at least one of a reference audio signal, a contextual noise signal including noise prior to the target utterance, or a speaker embedding including voice characteristics of a target speaker that spoke the target utterance. The operations further include processing, using the contextual frontend processing model, the input speech features and the at least one of the reference audio signal, the contextual noise signal, or the speaker embedding vector to generate enhanced speech features.

Implementations of the disclosure may include one or more of the following optional features. In some implementations, the contextual frontend processing model includes a conformer neural network architecture that combines convolution and self-attention to model short-range and long-range interactions. In some examples, processing the input speech features and the at least one of the reference audio signal, the contextual noise signal, or the embedding vector includes processing, using a primary encoder, the input speech features to generate a main input encoding, and processing, using a noise context encoder, the contextual noise signal to generate a contextual noise encoding. These examples further include processing, using a cross-attention encoder, the main input encoding and the contextual noise encoding to generate a cross-attention embedding, and decoding the cross-attention embedding into the enhanced input speech features corresponding to the target utterance. In these examples, processing the input speech features to generate the main encoding may further include processing the input speech features stacked with reference features corresponding to the reference audio signal to generate the main input encoding. The input speech features and the reference features may each include a respective sequence of log Mel-filterbank energy (LFBE) features.

In these examples, processing the input features to generate the main input encoding may include combining the input speech features with the speaker embedding vector using feature-wise linear modulation (FiLM) to generate the main input encoding. Here, processing the main input encoding and the contextual noise encoding to generate the cross-attention embedding includes combining the main input encoding with the speaker embedding vector using FiLM to generate a modulated main input encoding, and processing the modulated main input encoding and the contextual noise encoding to generate the cross-attention embedding. Additionally or alternatively, the primary encoder may include N modulated conformer blocks, the context noise encoder may include N conformer blocks and execute in parallel with the primary encoder, and the cross-attention may include encoder M modulated cross-attention conformer blocks.

In some implementations, the data processing hardware executes the contextual frontend processing model and resides on a user device. The user device is configured to output the reference audio signal as playback audio via an audio speaker of the user device, and capture the target utterance, the reference audio signal, and the contextual noise signal via one or more microphones of the user device. In some examples, the contextual frontend processing model is trained jointly with a backend automatic speech recognition (ASR) model using a spectral loss and an ASR loss. In these examples, the spectral loss may be based on an L1 loss function and L2 loss function distance between an estimated ratio mask and an ideal ratio mask. Here, the ideal ratio mask is computed using reverberant speech and reverberant noise.

Additionally, in these examples, the ASR loss may be computed by generating, using an ASR encoder of the ASR model configured to receive enhanced speech features predicted by the contextual frontend processing model for a training utterance as input, predicted outputs of the ASR encoder for the enhanced speech features, generating, using the ASR encoder configured to receive target speech features for the training utterance as input, target outputs of the ASR encoder for the target speech features, and computing the ASR loss based on the predicted outputs of the ASR encoder for the enhanced speech features and the target outputs of the ASR encoder for the target speech features. In some implementations, the operations further include processing, using a backend speech system, the enhanced input speech features corresponding to the target utterance. In these implementations, the backend speech system may include at least one of an automatic speech recognition (ASR) model, a hotword detection model, or an audio or audio-video calling application.

Another aspect of the disclosure provides a contextual frontend processing model for automatic speech recognition using joint acoustic echo cancellation, speech enhancement, and voice separation that includes a primary encoder, a noise context encoder, a cross-attention encoder, and a decoder. The primary encoder receives, as input, input speech features corresponding to a target utterance and generate, as output, a main input encoding. The noise context encoder receives, as input, a contextual noise signal comprising noise prior to the target utterance, and generates, as output, a contextual noise encoding. The cross-attention encoder receives, as input, the main input encoding generated as output from the primary encoder and the contextual noise encoding generated as output from the noise context encoder, and generates, as output, a cross-attention embedding. The decoder decodes the cross-attention embedding into enhanced input speech features corresponding to the target utterance.

This aspect may include one or more of the following optional features. In some examples, the primary encoder is further configured to receive, as input, reference features corresponding to a reference audio signal, and generate, as output, the main input encoding by processing the input speech features stacked with the reference features. The input speech features and the reference features may each include a respective sequence of log Mel-filterbank energy (LFBE) features. In some implementations, the primary encoder is further configured to receive, as input, a speaker embedding comprising voice characteristics of a target speaker that spoke the target utterance, and generate, as output, the main input encoding by combining the input speech features with the speaker embedding using feature-wise linear modulation (FiLM).

In some examples, the cross-attention encoder is further configured to receive, as input, the main input encoding modulated by a speaker embedding using feature-wise linear modulation (FiLM), the speaker embedding including voice characteristics of a target speaker that spoke the target utterance, and process the main input encoding modulated by the speaker embedding and the contextual noise encoding to generate, as output, the cross-attention embedding. In some implementations, the primary encoder includes N modulated conformer blocks, the context noise encoder includes N conformer blocks and execute in parallel with the primary encoder, and the cross-attention includes encoder M modulated cross-attention conformer blocks. In some examples, the contextual frontend processing model executes on data processing hardware residing on a user device. Here, the user device is configured to output a reference audio signal as playback audio via an audio speaker of the user device, and capture the target utterance, the reference audio signal, and the contextual noise signal via one or more microphones of the user device.

In some implementations, the contextual frontend processing model is trained jointly with a backend automatic speech recognition (ASR) model using a spectral loss and an ASR loss. In these implementations, the spectral loss may be based on an L1 loss function and L2 loss function distance between an estimated ratio mask and an ideal ratio mask. Here, the ideal ratio mask is computed using reverberant speech and reverberant noise. Additionally, in these implementations, the ASR loss is computed by receiving enhanced speech features predicted by the contextual frontend processing model for a training utterance as input, predicted outputs of the ASR encoder for the enhanced speech features, generating, using the ASR encoder configured to receive target speech features for the training utterance as input, target outputs of the ASR encoder for the target speech features, and computing the ASR loss based on the predicted outputs of the ASR encoder for the enhanced speech features and the target outputs of the ASR encoder for the target speech features. In some examples, a backend speech system is configured to process the enhanced input speech features corresponding to the target utterance. In these implementations, the backend speech system may include at least one of an automatic speech recognition (ASR) model, a hotword detection model, or an audio or audio-video calling application.

The details of one or more implementations of the disclosure are set forth in the accompanying drawings and the description below. Other aspects, features, and advantages will be apparent from the description and drawings, and from the claims.

BACKGROUND

Robustness of automatic speech recognition (ASR) systems has significantly improved over the years with the advent of neural network-based end-to-end models, large-scale training data, and improved strategies for augmenting training data. Nevertheless, various conditions such as echo, harsher background noise, and competing speech significantly deteriorate performance of ASR systems. While separate ASR models may be trained to handle these conditions, the difficulty in maintaining multiple task/condition-specific ASR models and switching between the models on the fly during use is not practical.

DESCRIPTION OF DRAWINGS

Like reference symbols in the various drawings indicate like elements.

DETAILED DESCRIPTION

Figure 1:
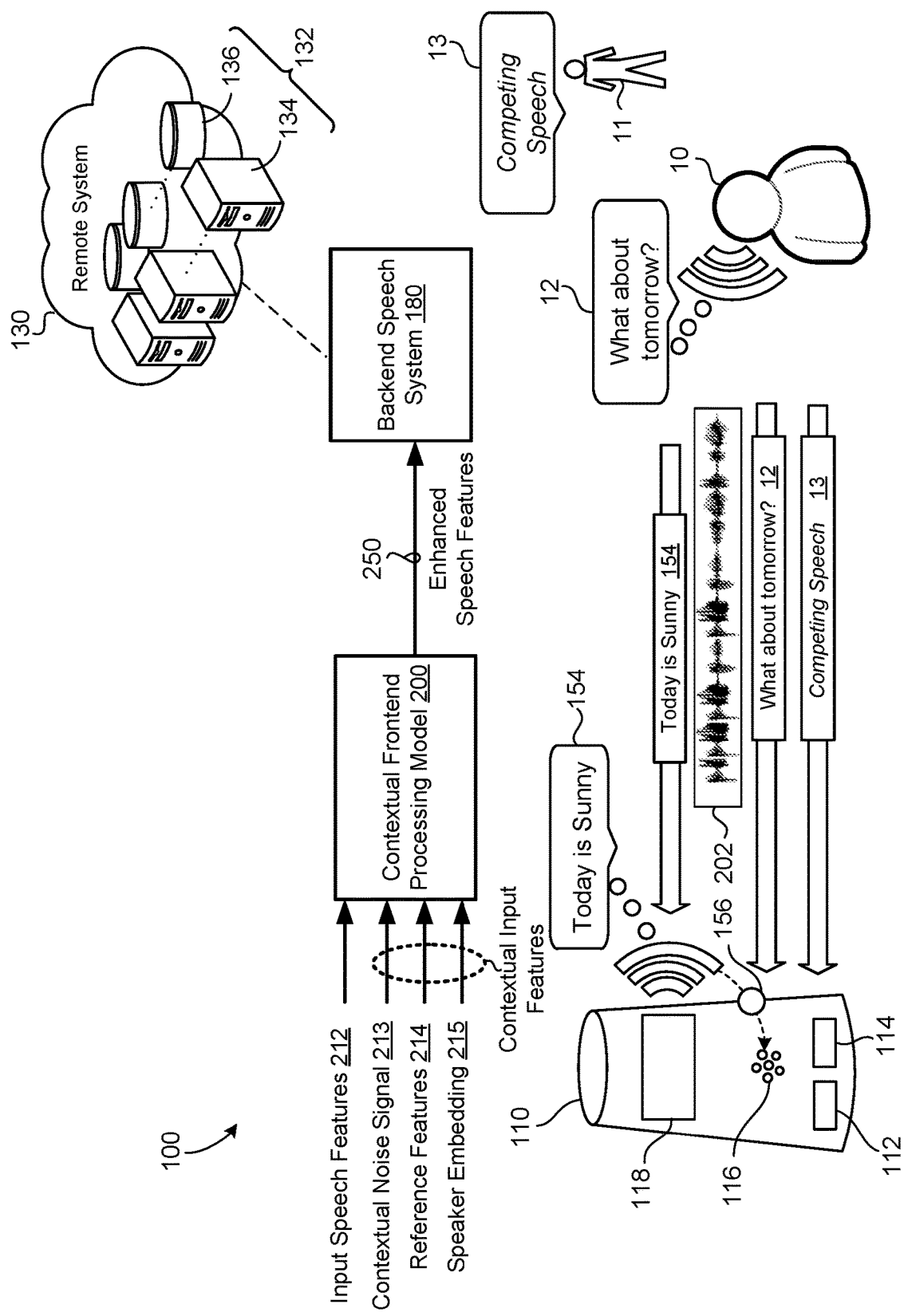
FIG. 1 is a schematic view of an example speech environment that includes a user communicating a spoken target utterance to a speech-enabled user device.

Robustness of automatic speech recognition (ASR) systems has significantly improved over the years with the advent of neural network-based end-to-end models, large-scale training data, and improved strategies for augmenting training data. Nevertheless, background interference can significantly deteriorate the ability of ASR systems to accurately recognize speech directed toward the ASR system. Background interference can be broadly classified into three groups: device echo; background noise; and competing speech. While separate ASR models may be trained to handle each of these background interference groups in isolation, the difficulty in maintaining multiple task/condition-specific ASR models and switching between the models on the fly during use is not practical.

Device echo may correspond to playback audio output from devices, such as smart home speakers, whereby the playback audio is recorded as echo and can affect performance of a backend speech system, such as an ASR system. Particularly, degradation of performance of the backend speech system is especially severe if the playback audio contains audible speech, e.g., a text-to-speech (TTS) response from a digital assistant. This problem is typically addressed via acoustic echo cancelation (AEC) techniques. A unique characteristic of AEC is that a reference signal corresponding to the playback audio is typically available and can be used for suppression.

Background noise with non-speech characteristics is usually well handled using data augmentation strategies like multi-style training (MTR) of the ASR models. Here, a room simulator is used to add noise to the training data, which is then carefully weighted with clean data during training to get a good balance in performance between clean and noisy conditions. As a result, large scale ASR models are robust to moderate levels of non-speech noise. However, background noise can still affect performance of backend speech systems in the presence of low signal-to-noise ratio (SNR) conditions.

Unlike non-speech background noise, competing speech is quite challenging for ASR models that are trained to recognize a single speaker. Training ASR models with multi-talker speech can pose problems in itself, since it is hard to disambiguate which speaker to focus on during inference. Using models that recognize multiple speakers is also sub-optimal since it is hard to know ahead of time how many users to support. Furthermore, such multi-speaker models typically have degraded performance in single-speaker settings, which is undesirable.

The three aforementioned classes of background interference have typically been addressed in isolation of one another, each using separate modeling strategies. Speech separation has received a lot of attention in the recent literature using techniques like deep clustering, permutation invariant training, and using speaker embedding. When using speaker embedding, the target speaker of interest is assumed to be known a priori. Techniques developed for speaker separation have also been applied to remove non-speech noise, with modifications to the training data. AEC has also been studied in isolation or together in the presence of background noise. It is well known that improving speech quality does not always improve ASR performance since the distortions introduced by non-linear processing can adversely affect ASR performance. One way to mitigate this is to jointly train the enhancement frontend together with the backend ASR model.

Moreover, as the application of large scale multi-domain and multi-lingual ASR models continues to gain interest, the training data for these ASR models typically covers various acoustic and linguistic use cases (e.g., voice search and video captioning), thereby making it challenging to simultaneously address harsher noise conditions. As a result, it is often convenient to train and maintain separate frontend feature processing models capable of handling adverse conditions, without combining it with the backend ASR model.

Implementations herein are directed toward a contextual frontend processing model for improving robustness of ASR by jointly implementing acoustic echo cancellation (AEC), speech enhancement, and speech separation modules into a single model. A single joint model is practical from the standpoint that it is difficult, if not impossible, to know what class of background interference to address ahead of time, particularly in a streaming ASR setting. Specifically, the contextual frontend processing model includes a contextual enhancement neural network (CENN) capable of optionally making use of three different types of side contextual inputs: a reference signal associated with playback audio; noise context; and a speaker embedding representing voice characteristics of a target speaker of interest. As will become apparent, the reference signal associated with the playback audio is necessary for providing echo cancellation while the noise context is useful for speech enhancement. Additionally, the speaker embedding (when available) representing the voice characteristics of the target speaker is not only critical for speech separation, but is also helpful for echo cancellation and speech enhancement. For speech enhancement and separation, the noise context, i.e., a few seconds of audio before the target utterance to be recognized, carries useful information about the acoustic context. The CENN employs a respective neural network architecture configured to ingest each corresponding contextual side input to produce enhanced input speech features that may be passed to a backend speech system, such as, an ASR model that may process the enhanced input speech features to generate a speech recognition result for the target utterance. Notably, as the noise context and reference features are optional contextual side inputs, the noise context and reference features are assumed by the CENN to be respective uninformative silence signals when not available.

Referring to FIG. 1, in some implementations, a speech environment 100 includes a user 10 communicating a spoken target utterance 12 to a speech-enabled user device 110 (also referred to as a device 110 or a user device 110). The user 10 (i.e., speaker of the utterance 12) may speak the target utterance 12 as a query or a command to solicit a response from the device 110. The device 110 is configured to capture sounds from one or more users 10, 11 within the speech environment 100. Here, the audio sounds may refer to a spoken utterance 12 by the user 10 that functions as an audible query, a command for the device 110, or an audible communication captured by the device 110. Speech-enabled systems of the device 110 or associated with the device 110 may field the query for the command by answering the query and/or causing the command to be performed.

Various types of background interference may interfere with the ability of a backend speech system 180 to process the target utterance 12 that specifies the query or command for the device 110. As aforementioned, the background interference may include device echo corresponding to playback audio 154 output from the user device (e.g., a smart speaker) 110, competing speech 13 such as utterances 13 other than the target utterance 12 spoken by one or more other users 111 that are not directed toward the user device 110, and background noise with non-speech characteristics. Implementations herein employ a contextual frontend processing model 200 that executes on the user device 110 and is configured to receive, as input, input speech features corresponding to the target utterance 12 and one or more contextual signals 213, 214, 215, and generate, as output, enhanced input speech features 250 corresponding to the target utterance 12 by processing the input speech features 212 and the one or more contextual 213, 214, 215. A backend speech system 180 may process the enhanced speech features 250 to generate an output 182. Notably, the contextual frontend processing model 200 effectively removes the presence of background interference recorded by the device 110 when the user 10 spoke the target utterance 12 such that the enhanced speech features 250 provided to the backend speech system 180 convey the speech (i.e., target utterance 12) that was intended for the device 110 so that the backend speech system 180 is not degraded by background interference.

In the example shown, the backend speech system 180 includes an ASR system that employs an ASR model to process the enhanced input speech features 250 to generate a speech recognition result (e.g., transcription) for the target utterance 12. The ASR system may further include a natural language understanding (NLU) module that performs semantic interpretation on the transcription of the target utterance 12 to identify the query/command directed toward the user device 110. As such, the output 180 from the backend speech system 180 may include the transcription and/or instructions to fulfill the query/command identified by the NLU module.

The backend speech system 180 may additionally or alternatively include a hotword detection model configured to detect whether or not the enhanced input speech features 250 include a presence of one or more hotwords/warm words the hotword detection model is trained to detect. For instance, the hotword detection model may output a hotword detection score indicating a likelihood that the enhanced input speech features 250 corresponding to the target utterance 12 include a particular hotword/warm word. Detection of a hotword may trigger a wake-up process that causes the device 110 to wake-up from a sleep state. For instance, the device 110 may wake-up and process the hotword and/or one or more terms preceding/following the hotword.

In additional examples, the background speech system 180 includes an audio or audio-video calling application (e.g., a video conferencing application). Here, the enhanced input speech features 250 corresponding to the target utterance 12 are used by the audio or audio-video calling application to filter the voice of the target speaker 10 for communications to recipients during an audio or audio-video communication session. The background speech system 180 may additionally or alternatively include a speaker identification model configured to perform speaker identification using the enhanced input speech features 250 to identify the user 10 that spoke the target utterance 12.

In the example shown, the user device 110 captures a noisy audio signal 202 (also referred to audio data) of the target utterance 12 spoken by the user 10 in the presence of background interference emanating from one or more sources other than the user 10. The device 110 may correspond to any computing device associated with the user 10 and capable of receiving noisy audio signals 202. Some examples of user devices 110 include, but are not limited to, mobile devices (e.g., mobile phones, tablets, laptops, etc.), computers, wearable devices (e.g., smart watches), smart appliances, and internet of things (IoT) devices, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations. The contextual frontend processing model 200 may execute on the data processing hardware 112. In some examples, the backend speech system 180 executes on the data processing hardware 112.

In some examples, the device 110 includes one or more applications (i.e., software applications) where each application may utilize enhanced input speech features 250 generated by the contextual frontend processing model 200 to perform various functions within the application. For instance, the device 110 includes an assistant application configured to communicate synthesized playback audio 154 to the user 10 to assist the user 10 with various tasks.

The device 110 further includes an audio subsystem with an audio capturing device (e.g., a microphone) 116 for capturing and converting spoken utterances 12 within the speech environment 100 into electrical signals and a speech output device (e.g., an audio speaker) 118 for communicating an audible audio signal (e.g., a synthesized playback signal 154 from the device 110). While the device 110 implements a single audio capturing device 116 in the example shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle.

In some examples, the device 110 is configured to communicate with a remote system 130 via a network (not shown). The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing and/or synthesized playback communication. The contextual frontend processing model 200 and the backend speech system 180 may reside on the device 110 (referred to as on-device systems) or reside remotely (e.g., reside on the remote system 130), but in communication with the device 110. In some examples, one or more backend speech systems 180 reside locally or on-device while one or more other backend speech systems 180 reside remotely. In other words, one or more backend speech systems 180 leveraging the enhanced input speech features 250 output from the contextual frontend processing model 200 may be local or remote in any combination. For instance, when a system 180 is rather large in size or processing requirements, the system 180 may reside in the remote system 130. Yet when the device 110 may support the size or the processing requirements of one or more systems 180, the one or more systems 180 may reside on the device 110 using the data processing hardware 112 and/or the memory hardware 114. Optionally, the one or more of the systems 180 may reside on both locally/on-device and remotely. For instance, a backend speech system 180 may default to execute on the remote system 130 when a connection between the device 110 and remote system 130 is available, but when the connection is lost or unavailable, the system 180 instead executes locally on the device 110.

In some implementations, the device 110 or a system associated with the device 110 identifies text that the device 110 will communicate to the user 10 as a response to a query spoken by the user 10. The device 110 may then use a text-to-speech (TTS) system to convert the text into corresponding synthesized playback audio 154 for the device 110 to communicate to the user 10 (e.g., audibly communicate to the user 10) as the response to the query. Once generated, the TTS system communicates the synthesized playback audio 154 to the device 110 to allow the device 110 to output the synthesized playback audio 154. For instance, the device 110 outputs the synthesized playback audio 154 of "today is sunny" at a speaker 118 of the device 110 responsive to the user 10 providing a spoken query for today's weather forecast.

With continued reference to FIG. 1, when the device 110 outputs the synthesized playback audio 154, the synthesized playback audio 154 generates an echo 156 captured by the audio capturing device 116. The synthesized playback audio 154 corresponds to a reference audio signal. While synthesized playback audio 154 depicts a reference audio signal in the example of FIG. 1, the reference audio signal may include other types of playback audio 154 including media content output from the speaker 118 or a communication from a remote user the user 10 is conversing with (e.g., voice over IP call or video conferencing call) through the device 110. Unfortunately, in addition to the echo 156, the audio capturing device 116 may also be simultaneously capturing the target utterance 12 spoken by the user 10 that includes a follow-up query inquiring more about the weather, by stating "what about tomorrow?" For example, FIG. 1 depicts that, as the device 110 outputs the synthesized playback audio 154, the user 10 inquires more about the weather, in a spoken utterance 12 to the device 110, by stating "what about tomorrow?" Here, the spoken utterance 12 and the echo 156 are both captured at the audio capturing device 116 simultaneously to form the noisy audio signal 202. In other words, the audio signal 202 includes an overlapped audio signal where some portion of the target utterance 12 spoken by the user 10 overlaps with some portion of the reference audio signal (e.g., synthesized playback audio) 154 output from the speaker 118 of the device 110. In addition to the synthesized playback audio 154, competing speech 13 spoken by another user 11 in the environment may also be captured by the audio capturing device 116 and contribute to background interference that overlaps with the target utterance 12.

In FIG. 1, the backend speech system 180 may have issues processing the target utterance 12 corresponding to the follow-up weather query "what about tomorrow?" in the noisy audio signal 202 due to the presence of the background interference attributed to at least one of the playback audio 154, competing speech 13, or non-speech background noise interfering with target utterance 12. The contextual frontend processing model 200 is employed to improve robustness of the backend speech system 180 by jointly implementing acoustic echo cancellation (AEC), speech enhancement, and speech separation models/modules into a single model.

In order to perform acoustic echo cancellation (AEC), the single model 200 uses the reference signal 154 that is being played back by the device as an input to the model 200. It is assumed that the reference signal 154 is temporally aligned with the target utterance 12, and is of the same length. In some examples, a feature extractor (not shown) extracts reference features 214 corresponding to the reference audio signal 154. The reference features 214 may include log Mel-filterbank energy (LFBE) features of the reference audio signal 154. Similarly, the feature extractor may extract speech input features 212 corresponding to the target utterance 12. The speech input features 212 may include LFBE features. As described in greater detail below, the speech input features 212 may be stacked with the reference features 214 and provided as input to a primary encoder 210 (FIG. 2) of the single model 200 to perform AEC. When there is no reference audio signal 154 being played by the device, an all-zero reference signal may be used such that only the speech input features 212 are received as input to the primary encoder 210.

The single model 200 may additionally perform speech enhancement in parallel with AEC by applying noise context modeling where the single model 200 processes a contextual noise signal 213 associated with a predetermined duration of noise segments captured by the audio capturing device 116 prior to the target utterance 12 spoken by the user 10. In some examples, the predetermined duration includes six (6) seconds of noise segments. As such, the contextual noise signal 213 provides noise context. In some examples, the contextual noise signal 213 includes LFBE features of the noise context signal for use as contextual information.

Optionally, the single model 200 may additionally perform target speaker modeling for speech separation jointly with AEC and speech enhancement. Here, a speaker embedding 215 is received as input by the single model 200. The speaker embedding 215 may include voice characteristics of the target speaker 10 that spoke the target utterance 12. The speaker embedding 215 may include a d-vector. In some examples, the speaker embedding 215 is computed using a text-independent speaker identification (TI-SID) model trained with a generalized end-to-end extended-set softmax loss. The TI-SID may include three long short-term memory (LSTM) layers with 768 nodes and a projection size of 256.

The output of the final frame of the last LSTM layer is then linearly transformed to the final 256-dimension d-vector.

For training and evaluations, each target utterance may be paired with a separate "enrollment" utterance from the same speaker. The enrollment utterance may be randomly selected from a pool of available utterances of the target speaker. The d-vectors are then computed on the enrollment utterance. For most real applications, the enrollment utterances are usually obtained via a separate offline process.

Figure 2:
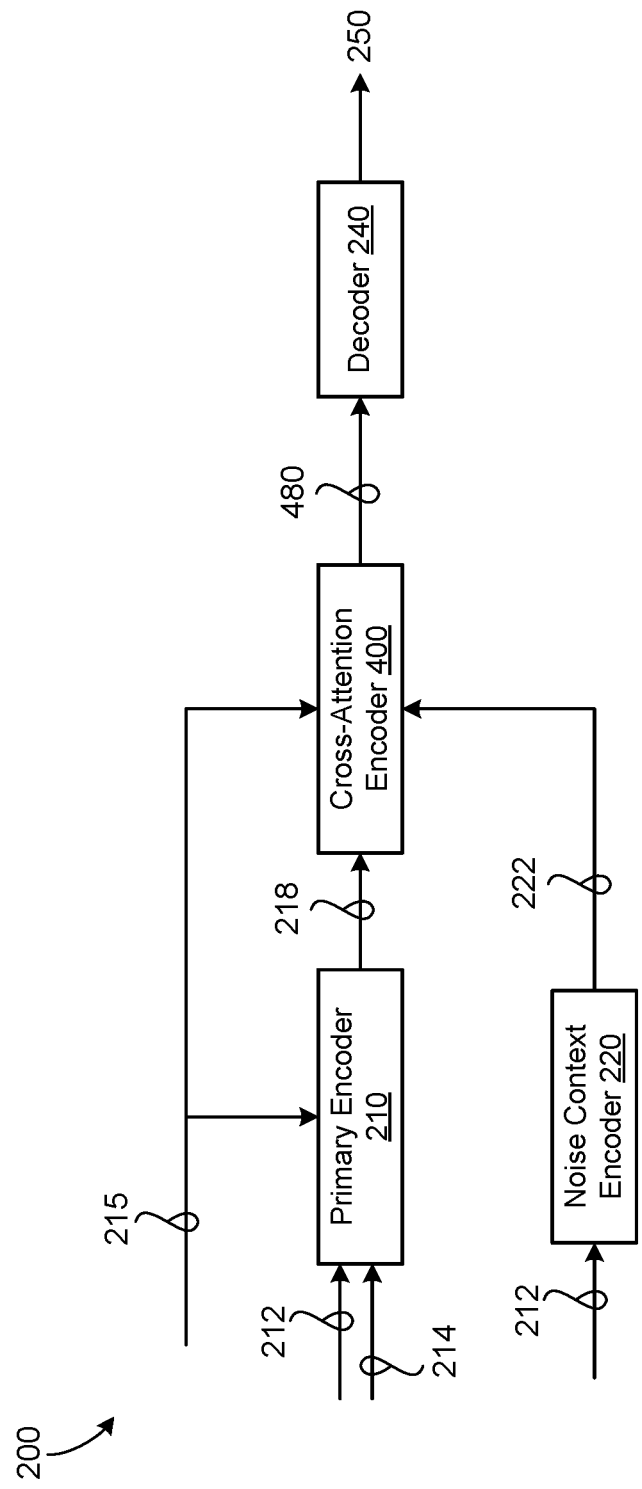
FIG. 2 is a schematic view of a contextual frontend processing model of FIG. 1.

FIG. 2 shows the contextual frontend processing model 200 of FIG. 1. The contextual frontend processing model 200 uses a modified version of a conformer neural network architecture that combines convolution and self-attention to model short-range and long-range interactions. The model 200 includes a primary encoder 210, a noise context encoder 220, a cross-attention encoder 400, and a decoder 240. The primary encoder 210 may include N modulated conformer blocks. The noise context encoder 220 may include N conformer blocks. The cross-attention encoder 230 may include M modulated cross-attention conformer blocks. The primary and noise context encoders 210, 220 may execute in parallel. As used herein, each conformer block may use local, causal self-attention to allow for streaming capabilities.

The primary encoder 210 may be configured to receive, as input, input speech features 212 corresponding to the target utterance, and generate, as output, a main input encoding 218. When the reference audio signal 154 is available, the primary encoder 210 is configured to receive the input speech features 212 stacked with reference features 214 corresponding to the reference audio signal as input and generate the main input encoding by processing the input speech features 212 stacked with the reference features 214. The input speech features and the reference features may each include a respective sequence of LFBE features.

Figure 3:
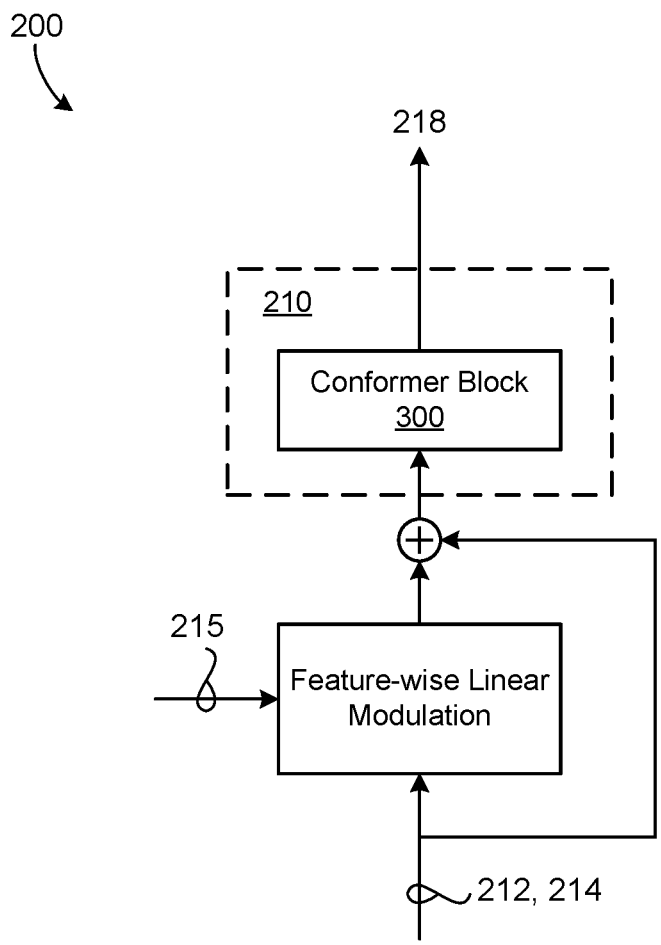
FIG. 3 is a schematic view of a modulated conformer block.

The primary encoder 210 may be further configured to receive, as input, the speaker embedding 215 (i.e., when available) including the voice characteristics of the target speaker 10 that spoke the target utterance 12, and generate, as output, the main input encoding by combining the input speech features 212 (or the input speech features stacked with the reference features 214) using a feature-wise linear modulation (FiLM) layer. FIG. 3 provides an example modulated conformer block 300 employed by the primary encoder 210. Here, before each conformer block at the primary encoder 210, the speaker embedding 215 (e.g., d-vector) is combined with the input speech features 212 (or stack of input speech and reference features 214) using the FiLM layer. FiLM permits the primary encoder 210 to adjust its encoding based on the speaker embedding 215 of the target speaker 10. A residual connection is added after the FiLM layer in order to ensure that the architecture can perform well when the speaker embedding is absent. Mathematically, the modulated conformer block 300 transforms input features x, using modulation features m, to produce output features y, as follows:

$$\tilde{x} = x + r(m) \odot x + h(m) \tag{1}$$

$$x' = \tilde{x} + \frac{1}{2} FFN(\tilde{x})$$

$$x'' = x' + Conv(x')$$

-continued $$x''' = x'' + MHSA(x'')$$

$$y = LayerNorm\left(x''' + \frac{1}{2}FFN(x''')\right).$$

Here, h(•) and r(•) are affine transformations. FFN, Cony, and MHSA stand for feed-forward module, convolution module, and multi-headed self-attention module, respectively. Eq. 1 shows the feature-wise linear modulation (FiLM) layer, with the residual connection.

Referring back to FIG. 2, the noise context encoder 220 is configured to receive, as input, a contextual noise signal 213 that includes the noise prior to the target utterance, and generate, as output, a contextual noise encoding 222. The contextual noise signal 213 may include LFBE features of the contextual noise signal. The noise context encoder 220, unlike the primary and cross-attention encoders 210, 400, includes standard conformer blocks without modulation by the speaker embedding 215. The noise context encoder 220 does not modulate the contextual noise signal 213 with the speaker embedding 215 since the contextual noise signal 213 is associated with acoustic noise context prior to the target utterance 12 is spoken, and thus, is assumed to contain information that should be passed forward to the cross-attention encoder 400 to aid with noise suppression.

With continued reference to FIG. 2, the cross-attention encoder 400 may be configured to receive, as input, the main input encoding 218 generated as output from the primary encoder 210 and the contextual noise encoding 222 generated as output from the noise context encoder 220, and generate, as output, a cross-attention embedding 480. Thereafter, the decoder 240 is configure to decode the cross-attention embedding 480 into the enhanced input speech features 250 corresponding to the target utterance 12. The contextual noise encoding 222 may correspond to an auxiliary input. The decoder may include a simple projection decoder having a single layer, frame-wise fully connected network with sigmoid activation.

Figure 4:
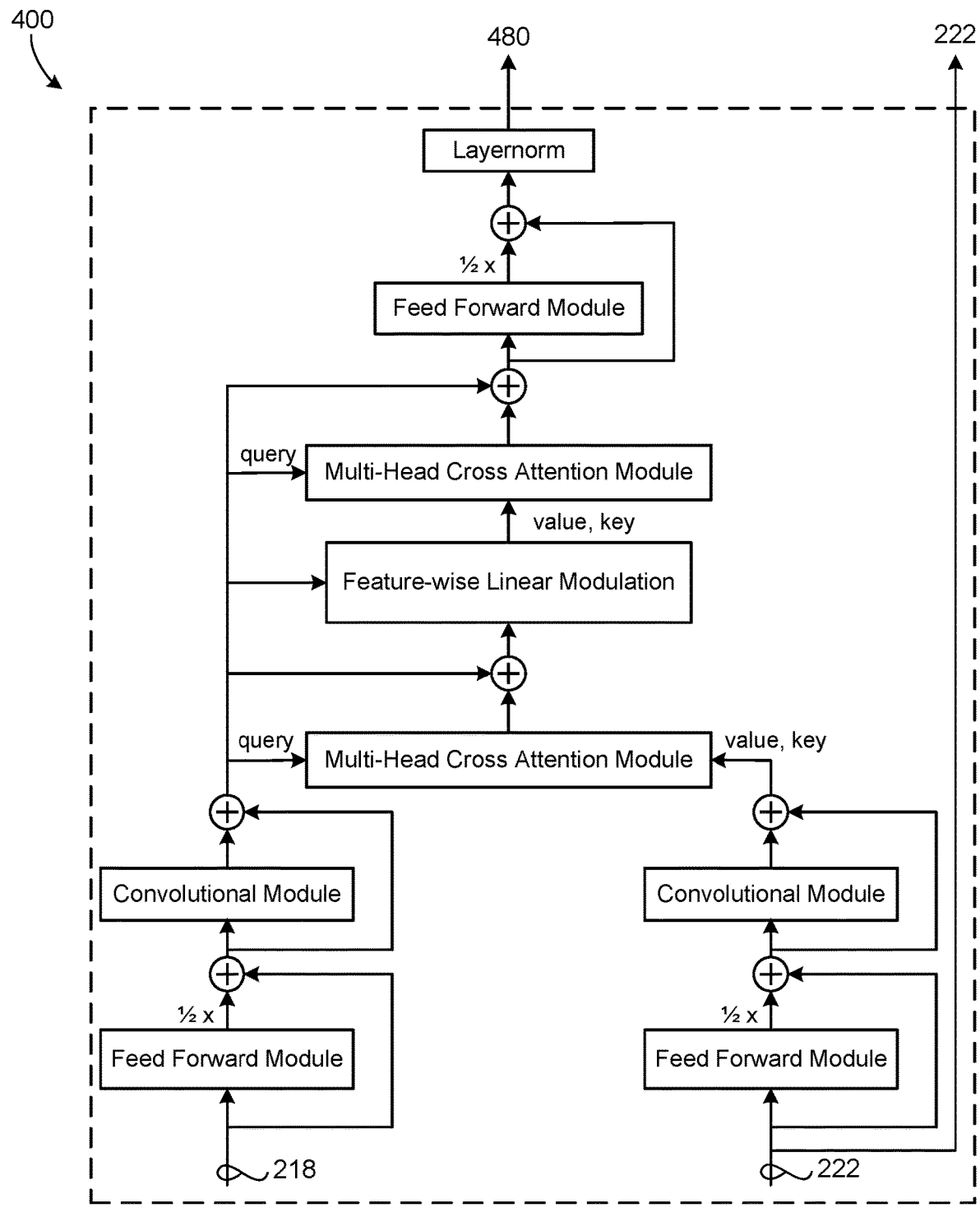
FIG. 4 is a schematic view of a modulated conformer block architecture implemented by a cross-attention encoder of the contextual frontend processing model.

As shown in FIG. 4, the cross-attention encoder 400 may employ a respective set of M modulated conformer blocks that each receive, as input, the main input encoding 218 modulated by the speaker embedding 215 using FiLM as described in FIG. 3 and the contextual noise encoding 222 output from the noise context encoder 220. The cross-attention conformer encoder first independently processes the modulated input 218 and the auxiliary input 222 using half feed-forward nets and convolutional blocks. Subsequently, a cross-attention block is used to summarize the auxiliary inputs using the processed input as the query vectors. Intuitively, the role of the cross-attention block is to summarize noise context separately for each input frame that is to be enhanced. The summarized auxiliary features are then merged with the inputs using a FiLM layer, which is followed by a second cross-attention layer to further process the merged features. Mathematically, if x, m, and n are the encoded input, d-vector and the encoded noise context from the previous layer, cross attention encoder does the following:

$$\hat{x} = x + r(m) \odot x + h(m) \quad (2)$$

$$\tilde{x} = \hat{x} + \frac{1}{2}FFN(\hat{x}), \tilde{n} = n + \frac{1}{2}FFN(n)$$

$$x' = \tilde{x} + Conv(\tilde{x}), n' = \tilde{n} + Conv(\tilde{n})$$

-continued $$x'' = x' + MHCA(x', n')$$

$$x''' = x' \odot r(x'') + h(x'')$$

$$x'''' = x' + MHCA(x', x''')$$

$$y = LayerNorm\left(x'''' + \frac{1}{2}FFN(x'''')\right).$$

Thus, inputs are modulated by each of the M conformer blocks by both the speaker embedding 215 associated with the target speaker and the noise context encoding 222.

In some implementations, the contextual frontend processing model is trained jointly with a backend automatic speech recognition (ASR) model using a spectral loss and an ASR loss. The training target for training the contextual frontend processing model 200 uses ideal ratio mask. IRMs are computed using reverberant speech and reverbant noise based on an assumption that speech and noise are uncorrelated in Mel spectral space as follows.

$$M(t, c) = \frac{X(t, c)}{X(t, c) + N(t, c)} \quad (3)$$

Here, X and N are the reverberant speech and reverberant noise Mel spectrograms, respectively. t and c, represent time and Mel frequency bin indices. We choose to estimate IRMs because the targets are bounded between [0, 1], simplifying the estimation process. Moreover, the ASR model used for evaluation and is trained on real and simulated reverberant data, making it relatively robust to reveberant speech. Therefore, IRMs derived using reverberant speech as the target still provide substantial gains in performance. The spectral loss during training are computed based L1 and L2 losses between the IRM and estimated IRM, M as follows.

$$\mathcal{L} = \sum_{t,c} |M(t, c) - \hat{M}(t, c)| + (M(t, c) - \hat{M}(t, c))^2 \text{ Where} \quad (4)$$

$$L1 = |M(t, c) - \hat{M}(t, c)|, \text{ and } L2 = (M(t, c) - \hat{M}(t, c))^2.$$

During inference, the estimated IRM is scaled and floored to reduce speech distortion at the expense of reduced noise suppression. This is especially important, since the ASR model is sensitive to speech distortions and non-linear frontend processing, which is one of the main challenges in improving performance of robust ASR models using enhancement frontends. The enhanced feature is derived as follows.

$$\hat{X}(t,c) = Y(t,c) \odot \max(\hat{M}(t,c), \beta)^\alpha \quad (5)$$

Here, Y is the noisy Mel spectrogram, $\hat{X}$ is an estimate of clean Mel spectrogram, $\alpha$ and $\beta$ are exponential mask scalar and mask floor, and $\odot$ is a pointwise multiplication. In our evaluations, $\alpha$ is set 0.5, and $\beta$ is set to 0.01. The enhanced features are log-compressed, i.e. log($\hat{X}$), and passed to the ASR model for evaluation.

Figure 5:
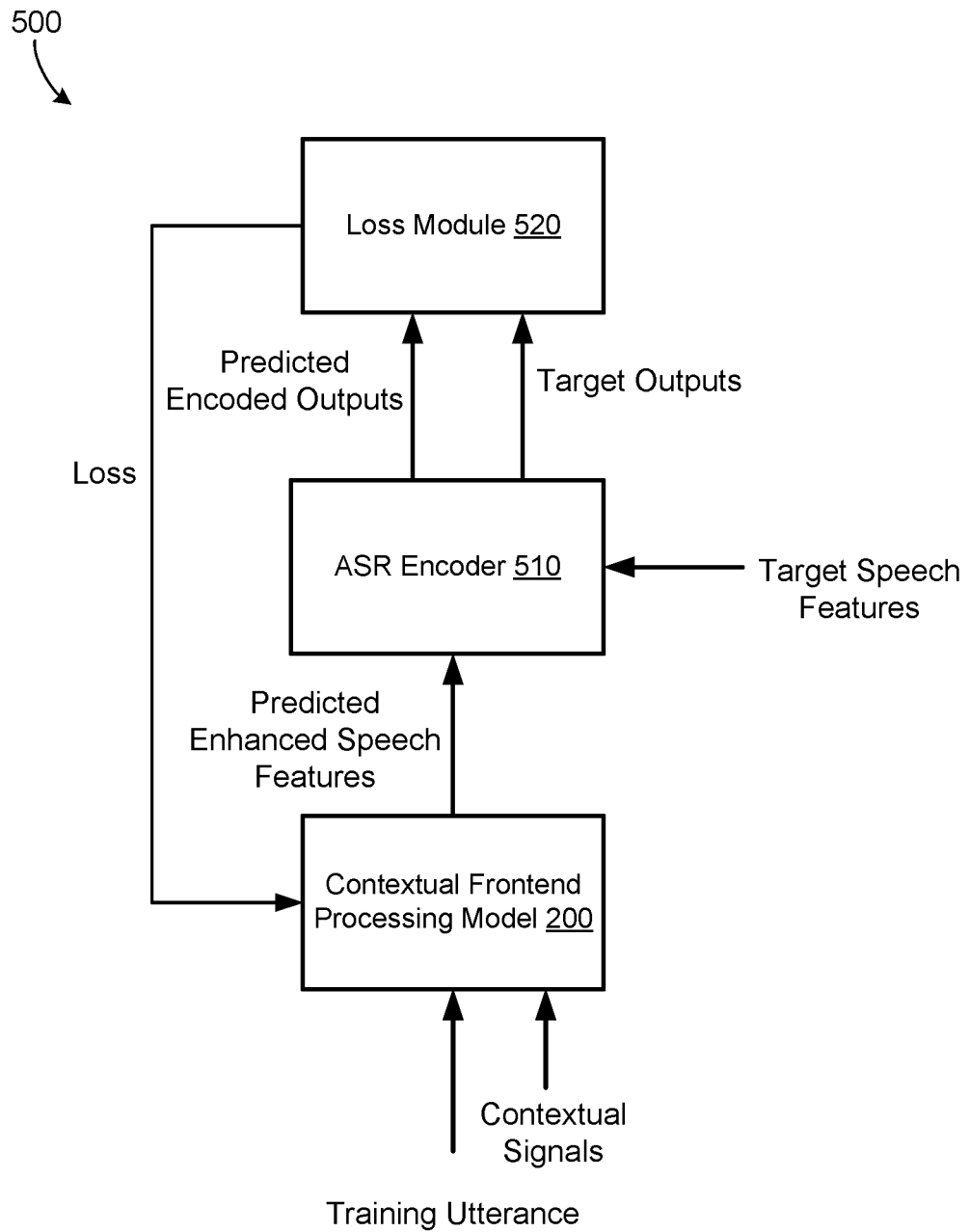
FIG. 5 is a schematic view of an example training process for jointly training a contextual frontend processing model and an automatic speech recognition model.

FIG. 5 shows an example training process 500 for computing the ASR loss when the contextual frontend processing model 200 is trained jointly with the ASR model. Here, only the encoder of the ASR model is used for computing the loss. The loss is computed as the l2 distance between the outputs of the ASR encoder 510 for the target features and the enhanced features. The ASR encoder 510 is not updated during training. In detail, the training process 500 computes the ASR loss by generating, using an ASR encoder 510 of the ASR model configured to receive enhanced speech features predicted by the contextual frontend processing model 200 for a training utterance as input, predicted outputs of the ASR encoder 510 for the enhanced speech features, and generating, using the ASR encoder 510 configured to receive target speech features for the training utterance as input, target outputs of the ASR encoder 510 for the target speech features. The predicted enhanced speech features and the target speech features may each include respective sequences of LFBE features. Thereafter, the training process 500, via a loss module 520, computes the ASR loss based on the predicted outputs of the ASR encoder 510 for the enhanced speech features and the target outputs of the ASR encoder 510 for the target speech features. The goal of using ASR loss is to make enhancement be more attuned to the ASR model, which is critical for getting the best performance out of the enhancement frontend. By keeping the ASR model's parameters fixed, the ASR model is decoupled from the contextual frontend processing model 200, thereby allowing each to be trained and deployed independent of each other.

Figure 6:
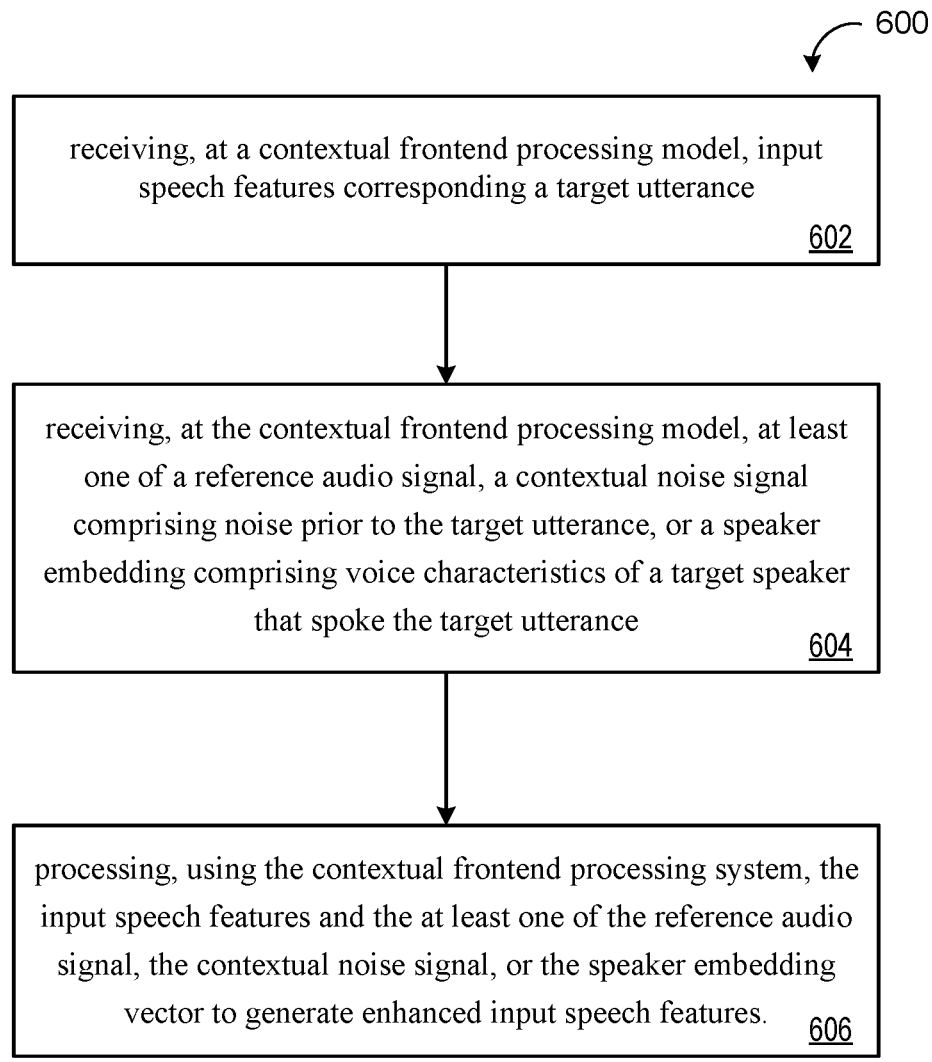
FIG. 6 is an example flowchart of an example arrangement of operations for a method of automatic speech recognition using a contextual frontend processing model.

FIG. 6 includes a flowchart of an example arrangement of operations for a method 600 of performing automatic speech recognition using a contextual frontend processing model 200. At operation 602, the method 600 includes receiving, at a contextual frontend processing model 200, input speech features 212 corresponding to a target utterance 12. The method 600 also includes, at operation 604, receiving, at the contextual frontend processing model 200, at least one of a reference audio signal 154, a contextual noise signal 213 including noise prior to the target utterance 12, or a speaker embedding vector 215 including voice characteristics of a target speaker 10 that spoke the target utterance 12. At operation 606, the method 600 further includes processing, using the contextual frontend processing model 200, the input speech features 212 and the at least one of the reference audio signal 154, the contextual noise signal 213, or the speaker embedding vector 215 to generate enhanced speech features 250.

Figure 7:
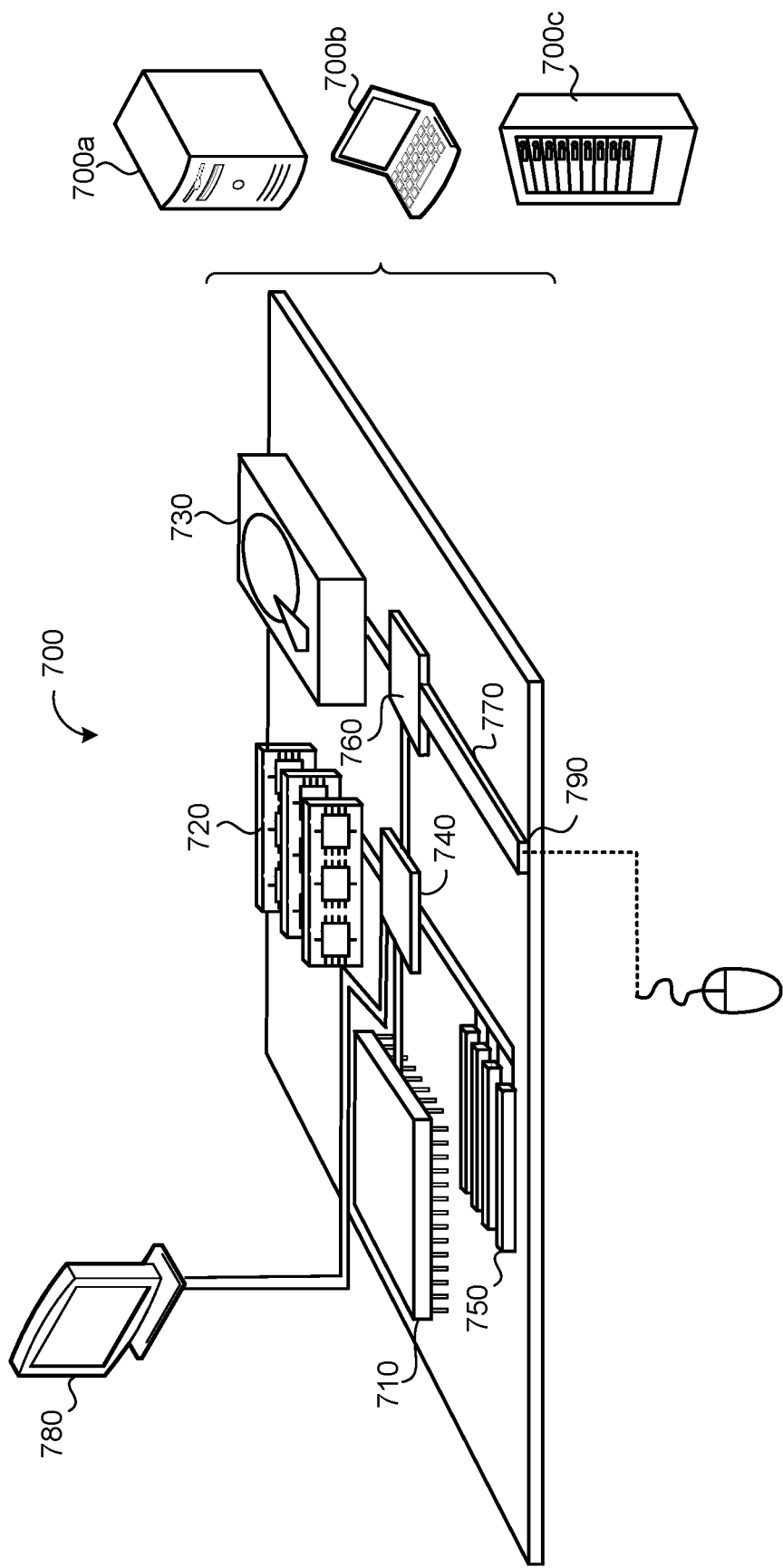
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosures described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
 receiving, at a contextual frontend processing model, input speech features corresponding a target utterance and at least one of:
  a reference audio signal;
  a contextual noise signal comprising noise prior to the target utterance; or
  a speaker embedding vector comprising voice characteristics of a target speaker that spoke the target utterance; and
 processing, using the contextual frontend processing model, the input speech features and the at least one of the reference audio signal, the contextual noise signal, or the speaker embedding vector to generate enhanced speech features by:
  processing, using a primary encoder, the input speech features to generate a main input encoding;
  processing, using a noise context encoder, the contextual noise signal to generate a contextual noise encoding;
  processing, using a cross-attention encoder, the main input encoding and the contextual noise encoding to generate a cross-attention embedding; and
  decoding the cross-attention embedding into the enhanced speech features corresponding to the target utterance.

2. The computer-implemented method of claim 1, wherein the contextual frontend processing model comprises a conformer neural network architecture that combines convolution and self-attention to model short-range and long-range interactions.

3. The computer-implemented method of claim 1, wherein processing the input speech features to generate the main input encoding further comprises processing the input speech features stacked with reference features corresponding to the reference audio signal to generate the main input encoding.

4. The computer-implemented method of claim 3, wherein the input speech features and the reference features each comprise a respective sequence of log Mel-filterbank energy (LFBE) features.

5. The computer-implemented method of claim 1, wherein:
processing the input speech features to generate the main input encoding comprises combining the input speech features with the speaker embedding vector using feature-wise linear modulation (FiLM) to generate the main input encoding; and
processing the main input encoding and the contextual noise encoding to generate the cross-attention embedding comprises:
combining the main input encoding with the speaker embedding vector using FiLM to generate a modulated main input encoding; and
processing the modulated main input encoding and the contextual noise encoding to generate the cross-attention embedding.

6. The computer-implemented method of claim 1, wherein:
the primary encoder comprises N modulated conformer blocks;
the noise context encoder comprises N conformer blocks and executes in parallel with the primary encoder; and
the cross-attention encoder comprises M modulated cross-attention conformer blocks.

7. The computer-implemented method of claim 1, wherein the data processing hardware executes the contextual frontend processing model and resides on a user device, the user device configured to:
output the reference audio signal as playback audio via an audio speaker of the user device; and
capture the target utterance, the reference audio signal, and the contextual noise signal via one or more microphones of the user device.

8. The computer-implemented method of claim 1, wherein contextual frontend processing model is trained jointly with a backend automatic speech recognition (ASR) model using a spectral loss and an ASR loss.

9. The computer-implemented method of claim 8, wherein the spectral loss is based on an L1 loss function and L2 loss function distance between an estimated ratio mask and an ideal ratio mask, the ideal ratio mask computed using reverberant speech and reverberant noise.

10. The computer-implemented method of claim 8, wherein the ASR loss is computed by:
generating, using an ASR encoder of the ASR model configured to receive enhanced speech features predicted by the contextual frontend processing model for a training utterance as input, predicted outputs of the ASR encoder for the enhanced speech features;
generating, using the ASR encoder configured to receive target speech features for the training utterance as input, target outputs of the ASR encoder for the target speech features; and
computing the ASR loss based on the predicted outputs of the ASR encoder for the enhanced speech features and the target outputs of the ASR encoder for the target speech features.

11. The computer-implemented method of claim 1, wherein the operations further comprise processing, using a backend speech system, the enhanced speech features corresponding to the target utterance.

12. The computer-implemented method of claim 11, wherein the backend speech system comprises at least one of:
an automatic speech recognition (ASR) model;
a hotword detection model; or
an audio or audio-video calling application.

13. A contextual frontend processing model comprising:
a primary encoder configured to:
receive, as input, input speech features corresponding to a target utterance; and
generate, as output, a main input encoding;
a noise context encoder configured to:
receive, as input, a contextual noise signal comprising noise prior to the target utterance; and
generate, as output, a contextual noise encoding; and
a cross-attention encoder configured to:
receive, as input, the main input encoding generated as output from the primary encoder and the contextual noise encoding generated as output from the noise context encoder; and
generate, as output, a cross-attention embedding; and
a decoder configured to decode the cross-attention embedding into enhanced speech features corresponding to the target utterance.

14. The contextual frontend processing model of claim 13, wherein the primary encoder is further configured to:
receive, as input, reference features corresponding to a reference audio signal; and
generate, as output, the main input encoding by processing the input speech features stacked with the reference features.

15. The contextual frontend processing model of claim 14, wherein the input speech features and the reference features each comprise a respective sequence of log Mel-filterbank energy (LFBE) features.

16. The contextual frontend processing model of claim 13, wherein the primary encoder is further configured to:
receive, as input, a speaker embedding comprising voice characteristics of a target speaker that spoke the target utterance; and
generate, as output, the main input encoding by combining the input speech features with the speaker embedding using feature-wise linear modulation (FiLM).

17. The contextual frontend processing model of claim 13, wherein the cross-attention encoder is further configured to:
receive, as input, the main input encoding modulated by a speaker embedding using feature-wise linear modulation (FiLM), the speaker embedding comprising voice characteristics of a target speaker that spoke the target utterance; and
process the main input encoding modulated by the speaker embedding and the contextual noise encoding to generate, as output, the cross-attention embedding.

18. The contextual frontend processing model of claim 13, wherein:
the primary encoder comprises N modulated conformer blocks;
the noise context encoder comprises N conformer blocks and executes in parallel with the primary encoder; and
the cross-attention encoder comprises M modulated cross-attention conformer blocks.

19. The contextual frontend processing model of claim 13, wherein the contextual frontend processing model executes on data processing hardware residing on a user device, the user device configured to:
- output a reference audio signal as playback audio via an audio speaker of the user device; and
- capture the target utterance, the reference audio signal, and the contextual noise signal via one or more microphones of the user device.

20. The contextual frontend processing model of claim 13, wherein the contextual frontend processing model is trained jointly with a backend automatic speech recognition (ASR) model using a spectral loss and an ASR loss.

21. The contextual frontend processing model of claim 20, wherein the spectral loss is based on an L1 loss function and L2 loss function distance between an estimated ratio mask and an ideal ratio mask, the ideal ratio mask computed using reverberant speech and reverberant noise.

22. The contextual frontend processing model of claim 20, wherein the ASR loss is computed by:
- generating, using an ASR encoder of the ASR model configured to receive enhanced speech features predicted by the contextual frontend processing model for a training utterance as input, predicted outputs of the ASR encoder for the enhanced speech features;
- generating, using the ASR encoder configured to receive target speech features for the training utterance as input, target outputs of the ASR encoder for the target speech features; and
- computing the ASR loss based on the predicted outputs of the ASR encoder for the enhanced speech features and the target outputs of the ASR encoder for the target speech features.

23. The contextual frontend processing model of claim 13, wherein a backend speech system is configured to process the enhanced input speech features corresponding to the target utterance.

24. The contextual frontend processing model of claim 23, wherein the backend speech system comprises at least one of:
- an automatic speech recognition (ASR) model;
- a hotword detection model; or
- an audio or audio-video calling application.

* * * * *